UNITED STATES PATENT OFFICE.

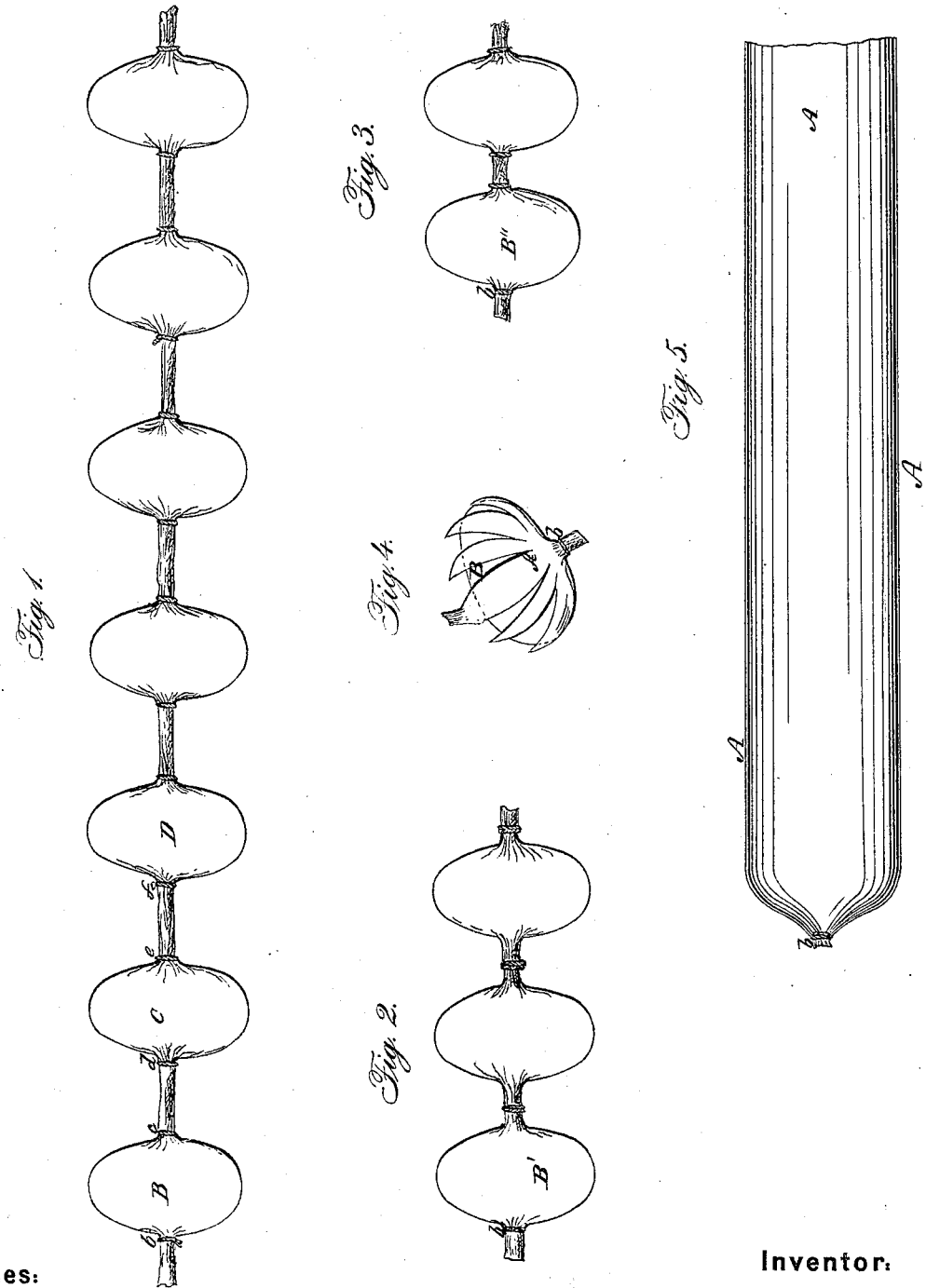

A. M. BLINVAL, OF NEW YORK, N. Y.

IMPROVEMENT IN PRESERVING EGGS.

Specification forming part of Letters Patent No. 41,053, dated January 5, 1864.

*To all whom it may concern:*

Be it known that I, A. M. BLINVAL, of New York city, in the county of New York, in the State of New York, have invented a new and useful Method of Preserving Eggs; and I do hereby declare that the following is a full and exact description thereof, reference being had to the accompanying drawings, making part of this application.

My invention has for its object a method of preparing or putting up eggs for preservation and transportation by which the eggs shall be prevented from becoming spoiled, (by the action of the atmospheric air,) shall be rather improved by age than otherwise, and by which I am enabled to transport them without loss from breakage of the shell, and present them in a more desirable condition to the market than that in which they are now found; and to these ends my invention consists in preserving eggs by incasing them, severally, in an impervious envelope or envelopes of suitable strength of texture to prevent the escape of any portion of the egg in the event of the shell being broken by concussion, and also in arranging several eggs in one enveloping case or covering in such manner that while each egg is provided with an impervious covering independently of that of the others the series of coverings are connected or united, so that several eggs are connected together, as will be presently more fully explained.

Previous to my invention it has been customary to put up or pack eggs by simply placing them in a barrel, (or other suitable receptacle,) together with a sufficient quantity of oats to fill in between them to hold the eggs out of contact with each other to prevent breakage. In this method of packing or putting up eggs for transportation and use it has been found that the action of the air on the eggs through the shells, which are pervious to air, soon spoils them; that when subjected to the contingencies of transportation a very large percentage of the whole quantity is lost by the eggs being broken and mixed with the oats, and also that those which become spoiled always expand and burst, and, mixing with the oats with which they are packed, render the latter to a great extent unfit for use.

With my method of packing or putting up eggs they are effectually protected from the action of the atmosphere, so that none of them spoil, but rather improve, by being kept some time. They are so incased as to be less liable to have their shells fractured during transportation, and in the event of any of the shells being broken, no matter how completely, the egg is retained perfectly within the impervious cover or envelope, so that no portion of it is lost, and so that the oats with which the eggs are packed or surrounded (in the barrel or box) are not at all contaminated by the latter, but are as valuable in market as though never employed in connection with the eggs.

To enable those skilled in the art to make and use my invention, I will now proceed to describe more particularly my new method of preserving and packing eggs, in connection with the accompanying drawings, illustrative thereof, in which—

Figure 1 shows a string (a series) of eggs enveloped according to my method. Fig. 2 is a view showing another series arranged a little differently. Fig. 3 shows still another arrangement of the eggs in the envelopes. Fig. 4 shows an egg and its envelope, with the latter cut open for the removal of the egg; and Fig. 5 is a partial elevation of one of the envelopes I propose to use.

I procure, for the purpose of carrying out my invention, the wissen-pipe of an ox, which I first simply clean out with a stick and turn it inside out and put it into strong lime-water, in which I let it remain about twenty-four hours. I then rinse it out in clear water, when it is ready to receive the eggs. I now tie up tight one end of this tube A (see Fig. 5) as seen at *b*, and drop in a fresh egg, around which I closely press and strain the tube A (in its pliable state) as seen at B, Fig. 1, and tie it again with a small cord at *c*, after which I twist up the tube into a sort of string for a short distance—say an inch or more—and tie it again at *d*. I then put in another egg, C, and pressing the material or substance of the tube or wissen-pipe closely all round it as before explained of B, tie the tube again at *e*, then again at *f*, and so on. I insert the eggs and tie the wissen-pipe A until the latter is all used up and presents, with the eggs in, the appearance shown at Fig. 1. I then place the eggs thus tied up in the wissen-pipe A in a strong lime-water and let them remain therein about three hours, and taking them out of this lime-water, let the whole dry previous to packing the eggs thus enveloped in barrels with oats for transportation.

It will be understood that the object and effect of soaking the wissen-pipe in the lime-water for about twenty-four hours is to purify it and close up its pores to render it impervious to air, and that the object of the second bath in the lime-water is to effectually close any pores which may not have been closed by the first bath, or which may have been opened by the operation of covering in the eggs, and to leave an almost inperceptible coating of lime to slightly harden the texture of the wissen-pipe as it dries.

In lieu of putting in the eggs in the fashion shown at Fig. 1, they may be arranged as shown at Fig. 2, with the tube A or covering tied only once between each couple of eggs, or, as shown at Fig. 3, with the eggs closer together.

I have found by actual experiment that the wissen-pipe thus prepared and the eggs inserted as explained induces the perfect preservation of the eggs, so that out of several dozens thus put up some months ago I have been unable now to discover one spoiled egg.

The covering or envelope A becomes exceedingly tough and strong, so that it requires a pretty hard knock to fracture the shell of the egg within, and when the egg's shell is broken all to pieces the egg cannot escape from the envelope surrounding it, which, however, may be readily cut open with a knife, to admit of the egg being taken out when desired, (either whole or the contents of the shell,) as illustrated at Fig. 4.

It will be understood that my invention is not limited to the particular article mentioned to form the impervious covering, as some other may be employed. For instance, the vulgarly called "straight gut" of an ox will answer the same purpose. It will require more cleaning and hold a greater number of eggs; but I prefer the article before mentioned, though any other or any substance (requiring perhaps different treatment in its preparation) which will make an impervious and sufficiently strong and cheap envelope will answer to carry out my invention.

It may be remarked that the egg generally considered best for use is that in which the yolk is surrounded by a strong film or skin, so that it can be tossed from one vessel to another without breaking, and that since I have discovered that fresh eggs preserved by my method acquire in a little while more generally and to a greater extent this peculiarity it may be concluded that eggs for some time preserved according to my plan are more desirable and better than fresh-laid eggs.

It will be observed that as a matter of convenience in handling and carrying eggs put up for the market in the form proposed are much more desirable than those sold in the ordinary condition.

I do not wish to limit myself in practicing my invention to any particular article or material for the formation of the impervious covering or envelope, or to the process described of treating such covering material or substance, nor to the arrangement of the eggs in the envelope shown and described; but, having fully explained my invention, so that those skilled can understand and use it,

What I claim as new, and desire to secure by Letters Patent, is—

1. Preserving eggs by inclosing them separately in an impervious covering or envelope, substantially as set forth.

2. Arranging several eggs, each being independently enveloped, as set forth, in a continuous covering, substantially as described.

In testimony whereof I have hereunto set my hand and affixed my seal.

A. M. BLINVAL. [L. S.]

In presence of—
J. N. McINTIRE,
M. M. LIVINGSTON.